United States Patent [19]

Treiber

[11] Patent Number: 4,485,913

[45] Date of Patent: Dec. 4, 1984

[54] CONVEYOR DRIVE SYSTEM

[75] Inventor: Fritz F. Treiber, Centerville, Ohio

[73] Assignee: Hobart Corporation, Troy, Ohio

[21] Appl. No.: 329,643

[22] Filed: Dec. 11, 1981

[51] Int. Cl.³ .............................................. B65G 13/07
[52] U.S. Cl. .................................... 198/790; 198/831
[58] Field of Search ............... 198/787, 789, 790, 831, 198/840, 861

[56] References Cited

U.S. PATENT DOCUMENTS

| | | | |
|---|---|---|---|
| 207,626 | 9/1878 | Sargent | 198/840 X |
| 1,756,653 | 4/1930 | McArthur | 198/787 |
| 2,487,196 | 11/1949 | Sternad et al. | 198/787 X |
| 2,493,479 | 1/1950 | Eggleston | 198/790 |
| 2,624,445 | 1/1953 | Wallman | 198/787 |
| 3,344,903 | 9/1967 | Holm | 198/790 |
| 3,369,646 | 2/1968 | Musser . | |
| 4,056,185 | 11/1977 | Cartwright | 198/861 X |
| 4,096,942 | 6/1978 | Shepherd . | |

Primary Examiner—Robert J. Spar
Assistant Examiner—Dennis Williamson
Attorney, Agent, or Firm—Biebel, French & Nauman

[57] ABSTRACT

A roller conveyor comprises an inner track formed from bearing material positioned in parallel to an outer track with a plurality of rollers rotatably disposed between the tracks. Each roller includes a central shaft having a necked portion near one end which necked portion engages one of a plurality of U-shaped slots formed in the inner track. A twin-V drive belt is supported on a plurality of open-faced pulleys for motion parallel to the inner track with the upper edge of the drive belt being exposed by the open-faced pulleys. The ends of the roller shafts beyond the necked portions extend beyond the inner track to form driven members which engage and are driven by the exposed upper edge of the twin-V drive belt to rotate the rollers.

4 Claims, 8 Drawing Figures

FIG-2b
FIG-3
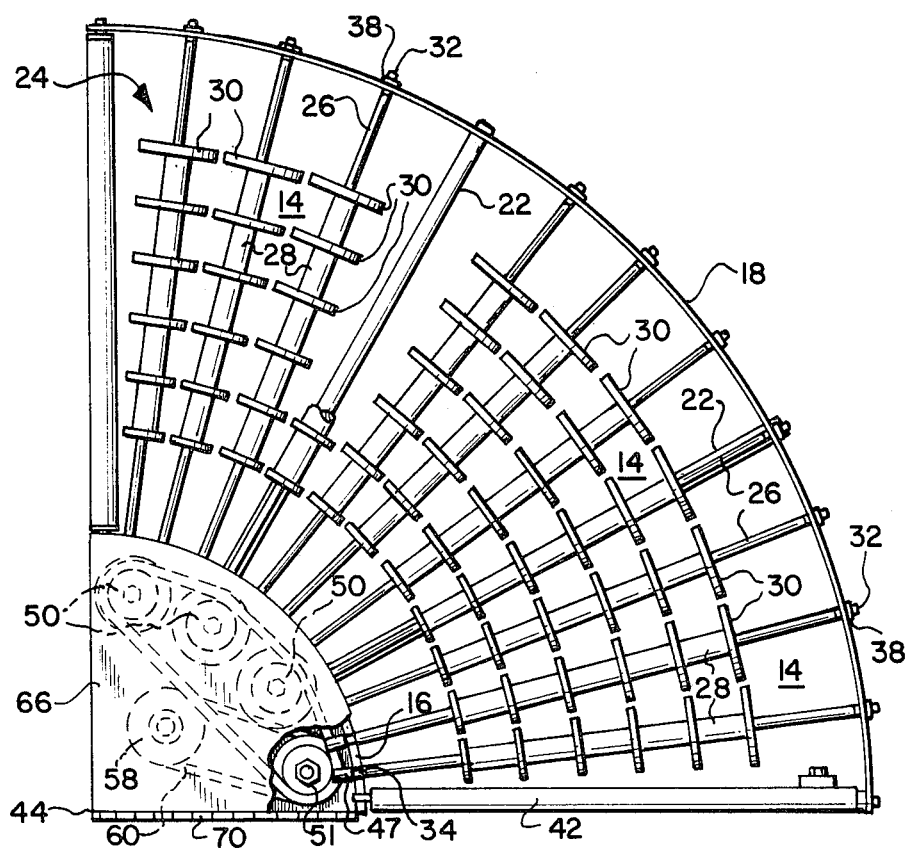
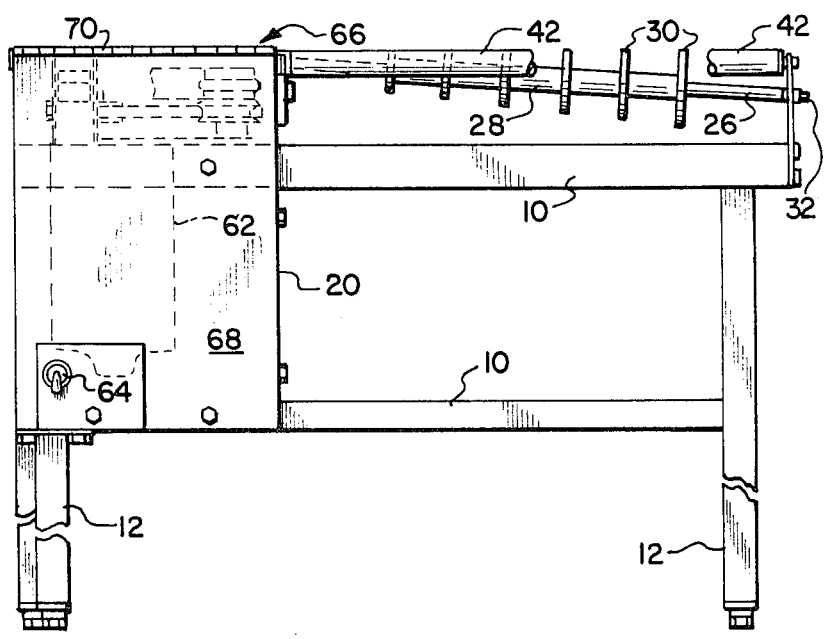

CONVEYOR DRIVE SYSTEM

BACKGROUND OF THE INVENTION

This invention relates to roller type conveyor apparatus and more particularly to a power drive system for such conveyors which drive system is particularly adaptable to curved sections of the conveyors.

The food processing industry as well as other industries involved in merchandising and packaging utilize roller type conveyors for movement and distribution of a great variety of package forms. These roller type conveyors can be passive, e.g., those driven by package inertia or gravity, or power driven. Power driven conveyors are used particularly in the horizontal movement of articles from one location to another.

A variety of roller conveyor drive systems are known in the prior art and these drive systems can be adapted to curved conveyor sections. For example, U.S. Pat. No. 1,959,157 discloses a V-belt drive system. A first flange formed to receive one of the angled drive faces of a V-belt is secured to each conveyor roller and a second freely rotating flange for receiving the other angled drive face of the V-belt is mounted opposite to each first flange. If a V-belt is positioned between the flanges, the conveyor roller will rotate as the belt is moved over the pulley formed by the two flanges.

In U.S. Pat. No. 3,369,646, a drive system for a conveyor curve is disclosed wherein a circular drive disc is rotated in the horizontal plane. A plurality of conically shaped rollers extend outwardly from the peripheral edge of the disc and include small wheel-like members attached to their inner ends. The wheel-like members engage the outer edge of the disc surface so that as the disc rotates the members and in turn the rollers rotate.

U.S. Pat. No. 4,096,942 discloses a conveyor drive system wherein a drive belt having a circular cross-section is used to drive pulleys frictionally coupled to the rollers of the conveyor. The drive belt is held against the roller pulleys by adjusting pulleys which are aligned with the roller pulleys for straight sections of conveyor and inclined relative to the axis of the rollers for curved sections of the conveyor.

In these prior art conveyor drive systems, the drive belts are positioned under the conveyor rollers where they are subject to damage and the accumulation of debris which fall between the rollers. These prior art conveyors provide either a positive drive to the rollers which can be dangerous in the event the rollers are inadvertently contacted by personnel working around the conveyors, or they provide a force which rotates the rollers up to a given resistance to provide for an accumulating conveyor.

The conveyor drive systems of the prior art also require considerable floor space when applied to curved conveyor sections which change the direction of movement of articles from a first line of movement to a second line of movement up to 180° displaced from the first line of movement. For example, the drive system shown in previously cited U.S. Pat. No. 3,369,646, which appears to provide the most compact conveyor curve of the cited prior art, includes a rotating disc which occupies considerable space even though only approximately one quarter of the disc is utilized by the drive system. The rotating disc not only occupies additional floor space but also requires separate conveyors external to the conveyor curve to transport articles to and from the conveyor rollers.

SUMMARY OF THE INVENTION

The shortcomings of the prior art are overcome by the conveyor of the present invention. A conveyor in accordance with the present invention comprises two tracks arranged parallel to one another and spaced apart from one another by an approximately constant distance. A plurality of rollers are rotatably disposed between the two tracks. Each of the rollers comprises a central shaft having spaced-apart circular discs secured thereto. For angular changes in the direction of movement of articles carried by the conveyor, the tracks are curved in parallel through an arc of the desired angular change. On curved sections of conveyor, the spaced-apart circular discs have progressively increasing diameters from a minimum diameter nearest to the inner track to a maximum diameter nearest to the outer track. The progressive changes in disc diameters provide an effectively tapering conveyor surface which imparts motion uniformly to articles carried on the conveyor curve.

Each of the rollers includes a cylindrical driven member fixed thereto and extending inwardly of the inner track of the conveyor. An endless conveyor drive belt having a flat outer surface and an inner drive surface having two projections, preferably forming twin V's, is supported for motion parallel to the inner track of the conveyor apparatus. The twin-V drive belt is supported by a plurality of pulleys which engage both drive surfaces of the lower V but only the lower drive surface of the upper V. Thus, the upper edge of the belt and the upper drive surface of the top V are exposed. One of the pulleys which support the drive belt includes an additional groove for receiving a belt driven by a pulley mounted on an electrical motor.

The inner track of the conveyor apparatus is formed from a bearing material, such as polytetrafluoroethylene (ptfe) commonly marketed under the trademark Teflon, and includes generally U-shaped slots for receiving circumferential grooves cut into the inner ends of the roller shafts. The ends of the roller shafts which extend beyond the grooves are the preferred form of the driven members. Roller support holes including bearing surfaces are formed in the outer track radially opposite to the slots in the inner track. The rollers of the conveyor apparatus in accordance with the present invention are positioned for rotation by these holes and slots which also provide for convenient and rapid removal and replacement of the rollers. The outer end of each roller is inserted into a roller support hole in the outer track until the groove in the inner end is aligned with the corresponding U-shaped slot formed in the inner track. The necked portion or groove of the shaft then slides into the slot and traps the roller against axial movement.

The U-shaped slots in the inner track are positioned and dimensioned relative to the drive belt so that the driven members of the rollers engage the upper edge of the belt and are supported and driven thereby. In this drive arrangement, the force applied to the roller increases in accordance with the weight of the articles being carried by the conveyor. However, in the event that a heavy force is applied to the rollers, such as by inadvertent personnel contact, the friction between the driven members and the edge of the belt is overcome and the rollers stop to prevent injury to the personnel.

In a power driven conveyor curve, the drive system of the present invention provides a compact unit with the drive system being completely contained within the inner sector of the arc traversed by the conveyor curve, i.e., between the inner track of the conveyor and the center point of the arc traversed by the conveyor curve.

It is an object of this invention to provide an improved drive system for a roller type conveyor utilizing a twin-V drive belt; to provide a drive system for a curved roller conveyor section utilizing a twin-V belt wherein the entire drive system, including the twin-V belt, is contained within a compact, covered compartment to protect the belt and drive mechanism from debris which falls through the rollers of the conveyor as well as personnel working around the conveyor; to provide a roller conveyor apparatus wherein the rollers can be quickly and conveniently removed and replaced for cleaning and maintenance of the conveyor apparatus; and to occupy minimum space while achieving the foregoing objects.

These objects as well as other objects and advantages of the present invention will become more apparent upon a review of the detailed description of the invention with reference to the drawing figures.

BRIEF DESCRIPTION OF THE DRAWINGS

FIG. 2b is a partially-sectioned plan view of the 90° curved conveyor section of FIG. 1.

FIG. 3 is a partially-sectioned front view of the 90° curved conveyor section of FIG. 1.

DETAILED DESCRIPTION OF THE INVENTION

Figure 4:
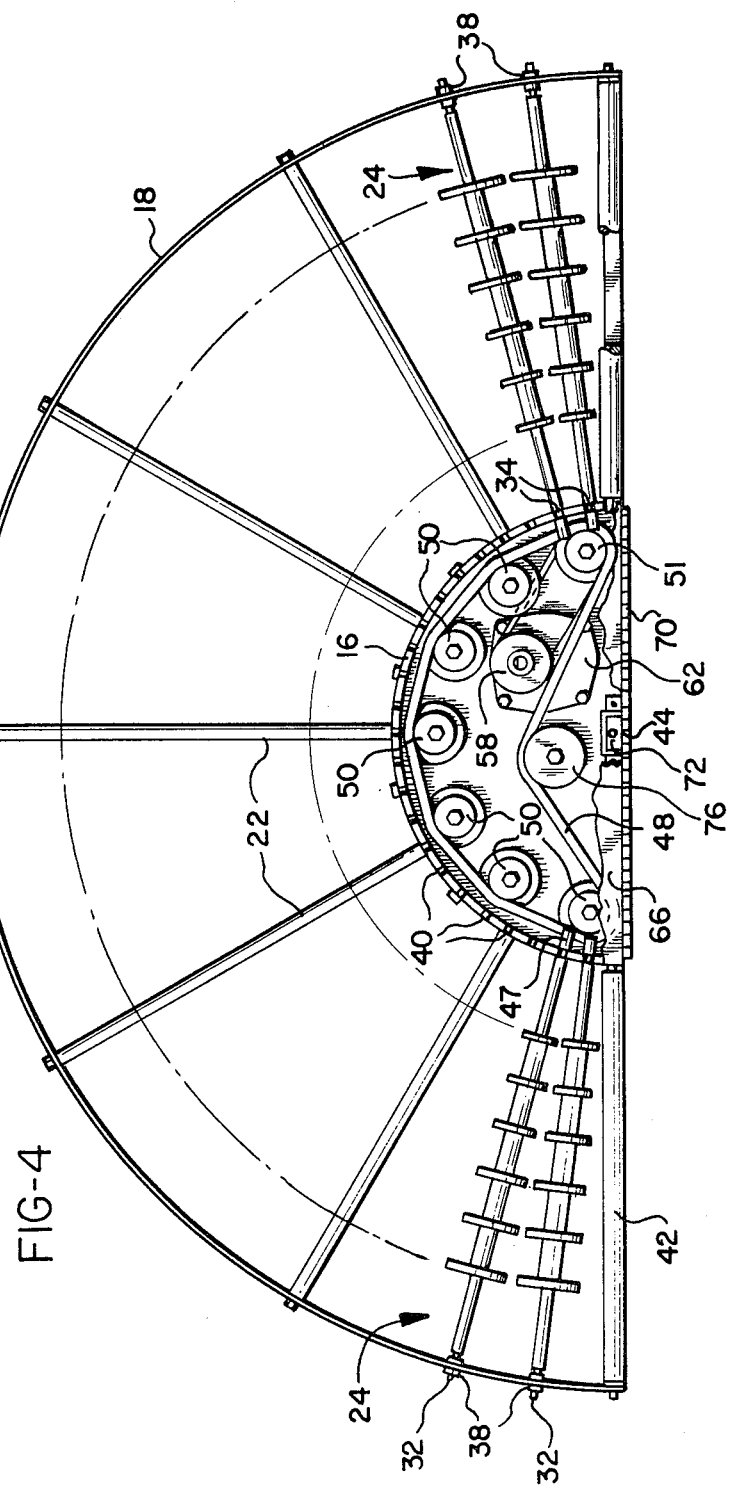
FIG. 4 is a partially-sectioned plan view of a 180° conveyor curve in accordance with the present invention.

The conveyor drive system of the present invention is disclosed with reference to curved conveyor sections where the drive system is most advantageously used. The curved conveyor sections are supported on frame members 10 which are in turn supported by vertical legs 12. The article carrying portion of the conveyor is open so that particles of debris can fall to the floor through spaces 14 between the rollers. An inner track 16 and an outer track 18 are curved to form an arc defining the angle traversed by the conveyor curve (90° as shown in FIGS. 1-3 and 5-7; and 180° as shown in FIG. 4).

The inner track 16 is constructed from a bearing material, such as ptfe, while the outer track 18 is constructed from metal, such as stainless steel. The inner track 16 is mounted to a radial wall 20 which partially houses the conveyor drive system. Tie rods 22 which extend between the outer track 18 and the radial wall 20 serve as spacers to maintain an approximately constant spacing between the inner track 16 and the outer track 18. Rollers 24 extend between and are supported by the outer track 18 and guided by the inner track 16 as will be described hereafter.

The rollers 24 each comprise an inner steel shaft 26 which is knurled over the central portion to receive an elongated spool 28. Each spool 28 comprises a plurality of concentric discs 30 which have progressively increasing diameters from the disc nearest the inner track 16 to the disc nearest the outer track 18. The spools 28 are preferably molded to the knurled portions of the steel shafts 26 with the knurls insuring that the spools 28 turn with the steel shafts 26. The steel shafts 26 each include a turned down extension 32 at the outer end and a necked circumferential groove 34 in the inner end.

The outer track 18 includes a plurality of roller support holes corresponding in number to the rollers 24 within the particular conveyor curve. An annular bearing 38 is formed or fitted within each of the support holes. The bearings 38 are dimensioned to receive in bearing engagement the turned down extensions 32 of the steel shafts 26 of the rollers 24 and are made from nylon or similar bearing material. A like plurality of U-shaped slots 40 (best seen in FIG. 6) are formed in the inner track 16 with the slots 40 being open to the upper surface of the track 16. The slots are dimensioned to receive the necked portions of the shafts 26, i.e., the circumferential grooves 34, to restrain the rollers 24 against axial motion.

A roller 24 is inserted into the conveyor by sliding its end extension 32 into a bearing 38 in the outer track 18 until the circumferential groove 34 is aligned with and received within the corresponding U-shaped slot 40 in the inner track 16. The rollers 24 are just as easily removed by reversing the process, i.e., the inner end of the roller 24 is raised to remove its groove 34 from its receiving slot 40 in the track 16 and the roller end extension 32 is removed from its receiving bearing 38 in the outer track 18. In this manner, the rollers are quickly and easily installed and removed for cleaning, maintenance or replacement purposes. It is noted that all the rollers 24 are alike and can be freely interchanged with one another in the conveyor.

The end rollers 42, one serving as the article entrance roller and the other as the article exit roller are not driven but rotate freely. The entrance/exit functions of the end rollers 42 are interchanged for reversals of the direction of operation of the conveyor curve. The end rollers 42 are mounted between the inner and outer tracks 16 and 18, respectively, in a manner similar to the rollers 24 for ease of installation and removal.

The conveyor drive system in accordance with the present invention is fitted within the inner sector of the conveyor curve, i.e., it is entirely housed between the inner track 16 and the center 44 of the arc of the conveyor curve. This compact packaging of the drive system provides a considerable reduction in the floor space required for conveyor systems utilizing the present invention. Such size reduction is graphically illustrated by a comparison of the 90° conveyor curve of the present invention (shown in solid lines in FIG. 2a) to the corresponding space required by the 90° conveyor curve of the prior art, U.S. Pat. No. 3,369,646 (the total space shown by the solid plus dashed lines in FIG. 2a). The additional space is required to accommodate the rotating drive disc 45 and external or associated conveyor sections needed to traverse spaces 46 necessitated by the disc 45.

The rollers 24 are driven by driven members 47 which comprise the innermost ends of the steel shafts 26 and extend beyond the U-shaped slots 40 in the inner track 16. A twin-V drive belt 48 is supported on a plurality of open-faced pulleys 50, 51 so that the outer face 48A of the twin-V belt 48 is disposed approximately parallel to the inner surface 16A of the inner track 16. The lower drive V 48B engages a groove 52 of the open faced pulleys 50, 51. Only the lower and possibly inner drive surfaces of the upper drive V 48C of the double-V belt 48 engage the open-faced groove 54 of the open-faced pulleys 50, 51. Thus, as best seen in FIG. 6, the upper edge and a portion of the upper drive V of the twin-V belt 48 extend above the pulleys 50, 51.

The bottoms of the U-shaped slots 40 extend below the upper edge 48D of the drive belt 48 so that the driven members 47 of the rollers 24 are supported on the upper edge 48D of the drive belt 48. The depth dimensions of the U-shaped slots 40 ensure driving contact between the driven members 47 and the upper edge of the twin-V belt 48, and also allow for deflections of the driven member 47 due to articles supported on the rollers 24 as well as wear of the upper edge of the twin-V belt 48 with time.

Figure 1:
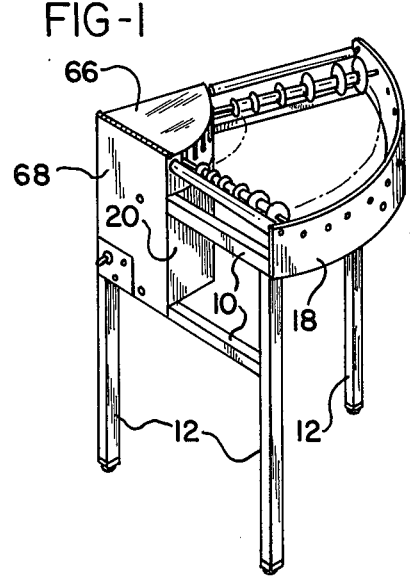
FIG. 1 is a perspective view of a 90° conveyor curve in accordance with the present invention.
Figure 2A:
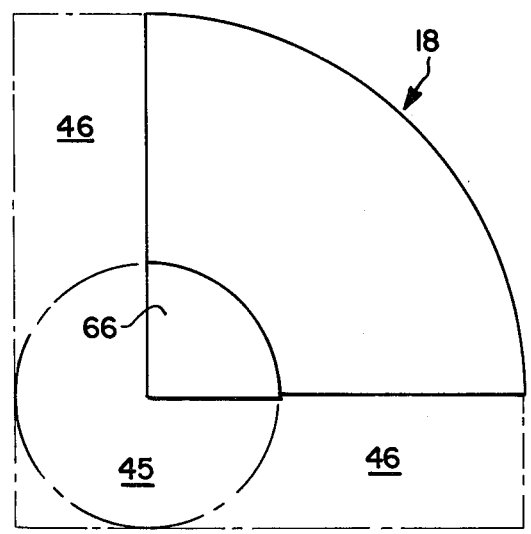
FIG. 2a is diagramatic drawing showing the differences in floor space occupied by the conveyor curve of FIG. 1 as compared to a comparable prior art conveyor curve.
Figure 6:
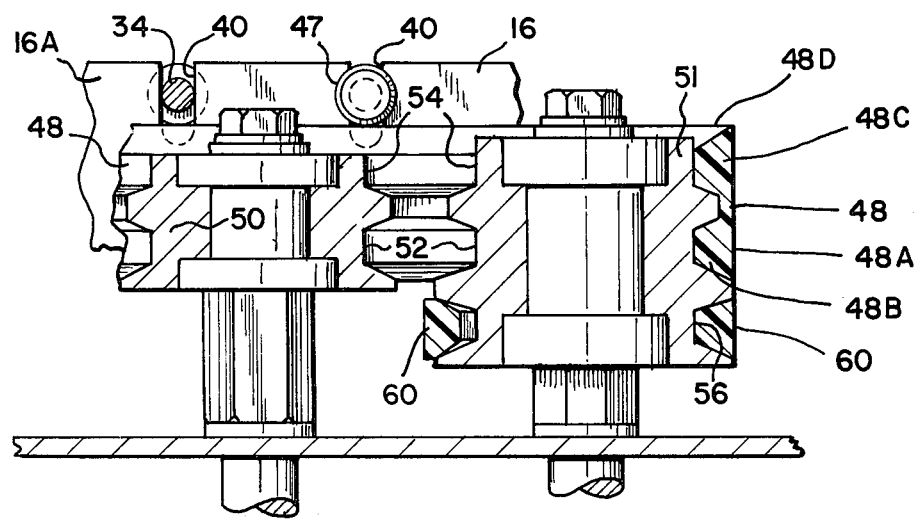
FIG. 6 is a sectioned view taken along the line 6—6 of FIG. 5.

The open-faced pulleys 50, 51 shown in FIG. 6 are of two varieties. The rightmost pulley 51 is the drive pulley for the twin-V drive belt 48. The drive pulley 51 includes a groove 56 which is coupled to a pulley 58 by a drive belt 60 so that the motor 62 can drive the twin-V belt 48. The remaining open-faced pulleys 50 guide the drive belt 48 and do not have the additional groove 56.

Figure 7:
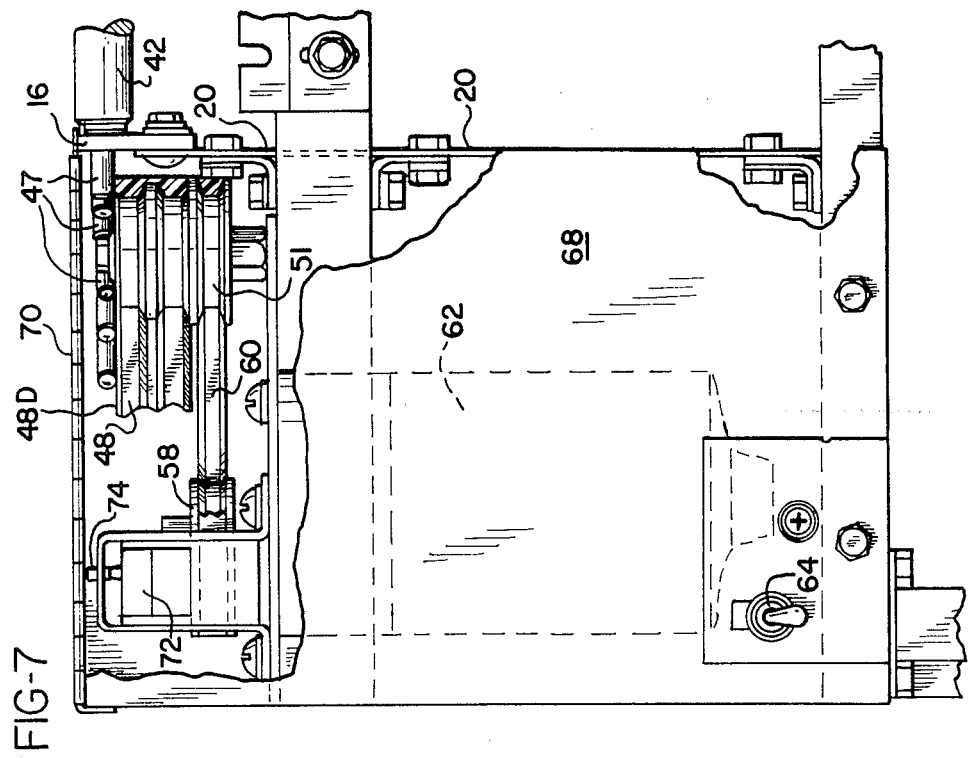
FIG. 7 is a partially-sectioned front view of the drive system for the 90° conveyor curve of FIG. 3 on an enlarged scale.
Figure 5:
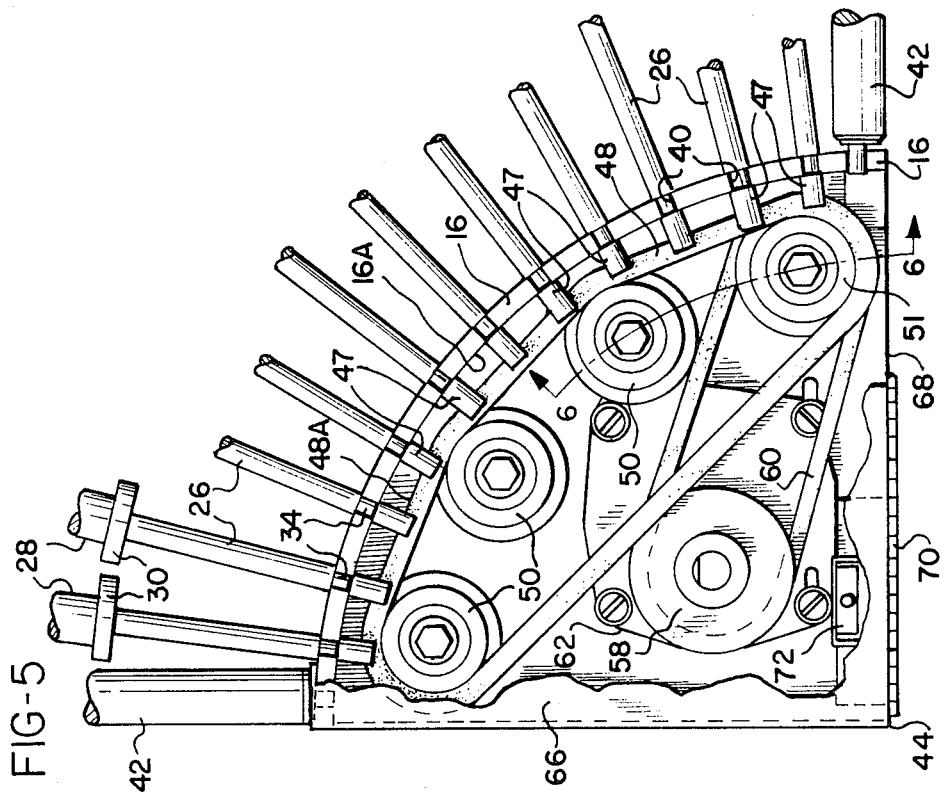
FIG. 5 is a partially-sectioned plan view of the drive system for the 90° conveyor curve of FIG. 2b on an enlarged scale.

The motor 62 is activated by a conveyor on/off electrical switch 64. The drive system of the present invention is entirely covered by a plate 66. The plate 66 is hingedly mounted to an outer housing wall 68 which is in turn supported on the frame members 10 and serves to cover the vertical exposure of the conveyor drive system. In the illustrative embodiments, the hinging of the plate 66 is performed by a piano hinge 70. The electrical switch 64 is enabled by a connection through a safety switch 72. A pin 74, as seen in FIG. 7, is disposed on the plate 66 to operate the safety switch 72 and thus enable operation of the drive system only when the drive system cover plate 66 is closed. A take-up pulley 76 is included in the 180° conveyor curve shown in FIG. 4 to adjust the tension of the twin-V belt 48 of that embodiment.

A conveyor such as the curved section shown in FIG. 2b or 4 is activated by operation of the switch 64 to activate the motor 62 through the safety switch 72 if the cover plate 66 is closed. The motor 62 drives belt 60 which in turn drives the twin-V belt 48 around the open faced-pulleys 50, 51 parallel to the inner track 16. The driven members 47 of the rollers 24 frictionally engage the upper edge of the twin-V belt 48 and are driven thereby. The frictional engagement between the driven members 47 and the upper edge of the belt 48 can be increased by knurling the driven members 47. Thus, the rollers 24 are rotated and articles supported on the discs 30 of the rollers 24 are carried along the conveyor surface defined by the outer periphery of the discs 30. Heavier packages force the rollers 24 and consequently the driven members 47 more firmly against the exposed upper edge of the twin-V belt 48 and, thus, increase the frictional engagement therebetween. However, if an excessive force is applied to a roller 24, such as by personnel inadvertently making contact with the roller, the upper edge of the twin-V belt 48 will slide past the corresponding driven member 47 to prevent injury to such personnel.

The present invention has been described herein with reference to curved conveyor sections, which are the preferred embodiments, however, it is to be understood that the drive system of the present invention can also be applied to straight conveyor sections.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A drive system for an arcuate conveyor section having a plurality of similar-length article conveying rollers disposed for support by and rotation between inner and outer concentrically-disposed horizontal tracks supported on a framework, said drive system comprising:

an endless double V-belt located horizontally inwardly of the inner track, said V-belt having a planar outer face and an inner driving face comprising at least two projections;

pulley means mounted on space vertical axes for supporting said V-belt for circulating motion in a horizontal plane with its said planar outer face disposed essentially concentric with and in close proximity to said inner track, the height of said pulley means being related to the V-belt so as to expose the thin upper side edge of said belt above the upper ends of said pulley means;

means on said rollers and said inner track for restraining said rollers against axial movement while allowing vertical movement of the ends of the rollers supported in said track;

a driven member comprising a shaft extension on that end of each roller supported by said inner track with said extensions extending inwardly from the rollers beyond said inner track and being in frictional engagement with and supported by the exposed upper edge of said belt; and drive means comprising an electric motor for driving said pulley means to impart motion to said belt and in turn rotate said rollers.

2. The drive system of claim 1 wherein said conveyor section traverses an angle of 90°.

3. The drive system of claim 1 wherein said conveyor section traverses an angle of 180°.

4. The drive system of claim 1 further comprising a safety switch for said motor and a cover hingedly supported on said framework above said drive system, said cover including a switch activating pin and said safety switch being disposed relative to said switch activating pin to stop said drive means when said cover is moved to a position exposing said drive system.

* * * * *